G. C. BEIDLER.
CAMERA.
APPLICATION FILED DEC. 8, 1916.

1,313,454.

Patented Aug. 19, 1919.
2 SHEETS—SHEET 1.

Witnesses
M. I. Pfeifer.
L. C. Parkey.

Inventor,
George C. Beidler,
By Frank S. Appleman,
Attorney.

G. C. BEIDLER.
CAMERA.
APPLICATION FILED DEC. 8, 1916.
1,313,454.
Patented Aug. 19, 1919.
2 SHEETS—SHEET 2.
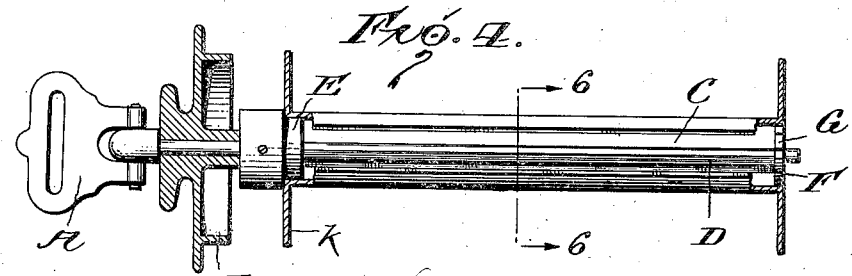
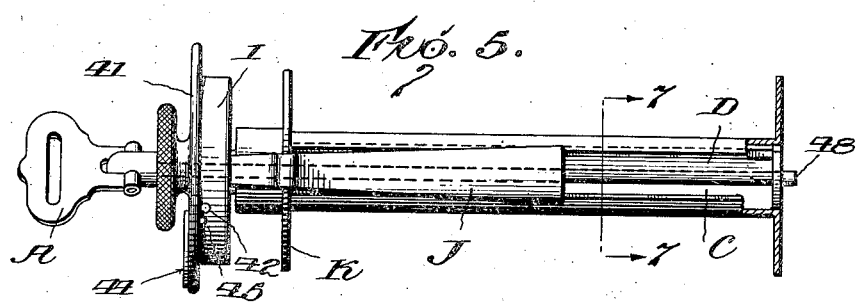
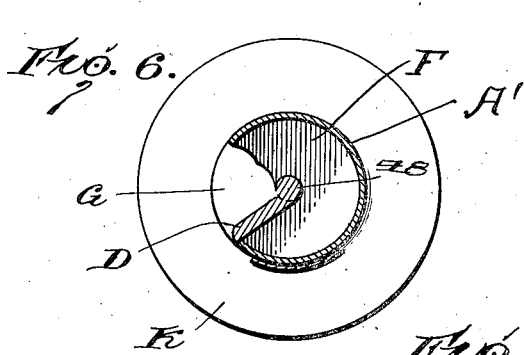
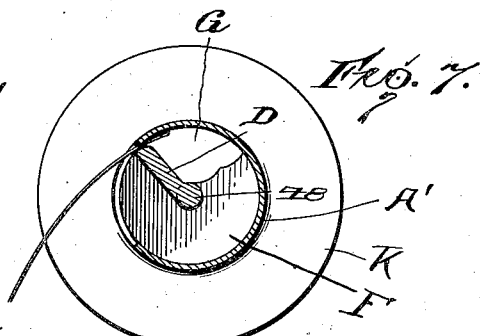
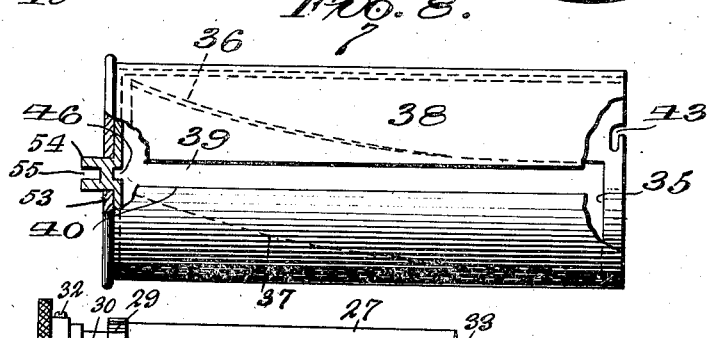

UNITED STATES PATENT OFFICE.

GEORGE C. BEIDLER, OF ROCHESTER, NEW YORK.

CAMERA.

1,313,454.        Specification of Letters Patent.     Patented Aug. 19, 1919.

Application filed December 8, 1916. Serial No. 135,858.

*To all whom it may concern:*

Be it known that I, GEORGE C. BEIDLER, a citizen of the United States of America, and resident of Rochester, in the county of Monroe and State of New York, have invented certain new and useful Improvements in Cameras, of which the following is a specification.

This invention relates to photographing apparatus and to means or instrumentalities by which film is moved from a spool container or magazine into position to be photographically exposed to light and then delivered to a spool container or magazine where it is wound, coiled or otherwise received and associated with it, means are provided for severing or cutting that portion that has passed through the exposing chamber or instrumentality from that portion which has not been exposed. It is understood, therefore, that one or a plurality of exposed sections or lengths or areas of film may be delivered to the container and that the length of film severed may be arbitrarily determined. For instance with hand cameras now in common use, an operator may make one or a plurality of exposures and after the film having the exposure thereon has been drawn out of the exposing chamber or means and delivered to the spool container or magazine, the said exposed portion may be severed from the other portion and removed from the camera or casing for the purpose of developing the exposed portion or portions while leaving the unexposed portion or web of film in the camera in an unimpaired state.

Hereafter, in the specification, the term "camera" will be employed and it is to be understood that it is meant thereby any of the so called "hand" cameras or other photographing apparatus by which sensitized material is exposed to light while being protected from light other than that admitted by the exposure. The term "spool" will likewise be employed and by that designation, it is understood that there is included any core upon which film is wound or any container or magazine in which the film is wound or which operates or acts as an instrumentality for holding film.

In so-called "hand" cameras or magazine-cameras using flexible film, those now in common use have film which is wound on a spool and the spool is inserted in the camera and an end of the film or an extension thereof is attached or applied to another spool on which the film is wound from the first mentioned spool, the said film in its travel passing to an exposing chamber, a point in the camera where it is exposed to light. In the said cameras now in common use, an inconvenience is experienced by reason of the inability of operators to develop the film containing one or a plurality of exposures prior to exposing the whole length of film, unless, of course, the unexposed portion is wasted. The present invention is designed to obviate this inconvenience and loss and, in practice, very satisfactory results have been obtained by reason of the provision for removing portions of the film as exposures are made without delaying the removal of the film from the camera until the whole length of film has been exposed.

I have illustrated herein certain embodiments of the invention for the purpose of enabling those skilled in the art to practice the same, but my experience has shown that the said invention may be practised in a number of ways with other constructions and I, therefore, wish it to be understood that the invention contemplates physical embodiments, other than those which I have illustrated.

A still further object of this invention is to provide means for winding film and permitting the removal of a portion of the winding mechanism with the contained film and the replacement of other substitute spools in operative relation to the spool rotating the winding mechanism so that spools may be successively used for receiving exposed film, the said spool being removable with any exposed part of a length of film.

With the foregoing and other objects in view, the invention consists in the broad idea to be set forth in the claims during the prosecution of the application, the said claims to be of such scope as to give protection commensurate with the inventive act in view of the state of the art when the said invention was produced.

In describing the invention in detail, reference will be had to the accompanying drawings forming part of this specification wherein like characters denote corresponding parts in the several views, and in which—

Fig. 4 illustrates a sectional view of a clamping member in an open position;

Fig. 5 illustrates a sectional view of the clamping member in closed position;

Fig. 6 illustrates a sectional view on a line 5—5 of Fig. 4;

Fig. 7 illustrates a sectional view on the line 7—7 of Fig. 5 showing the clamp in film engaging position;

Fig. 8 illustrates a side elevation of the container.

Fig. 9 illustrates a view in elevation of one of the feed rollers.

Figure 1:
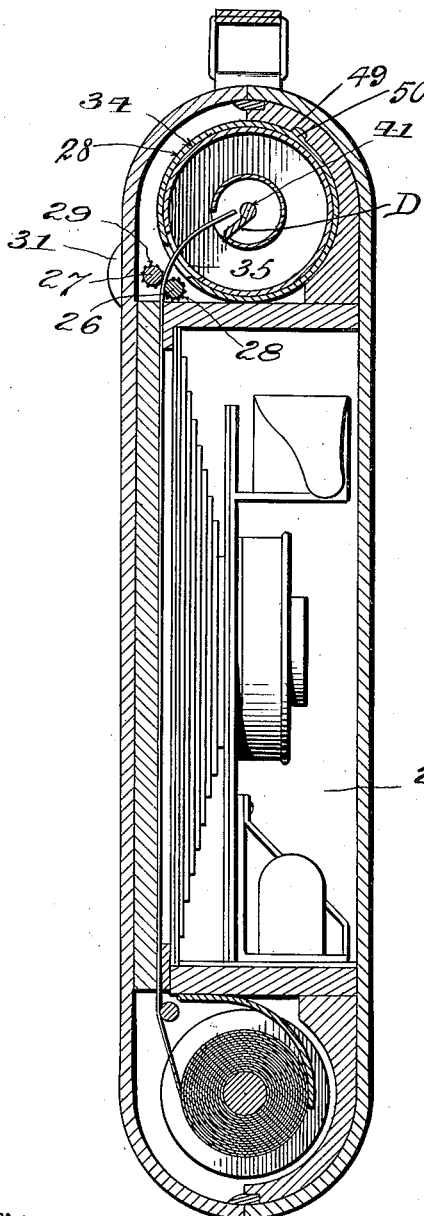
Figure 1 illustrates a sectional view of a camera with the invention applied thereto.
Figure 2:
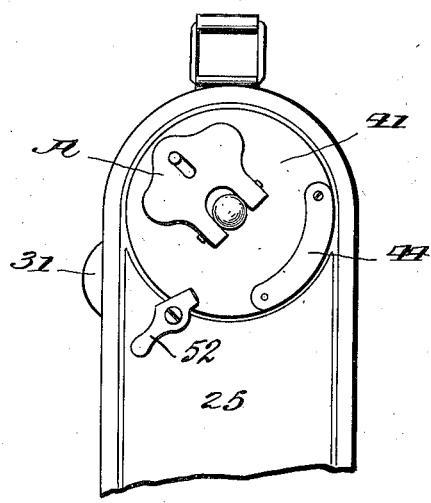
Figs. 2 and 3 illustrate edge views of fragments of the camera.
Figure 3:
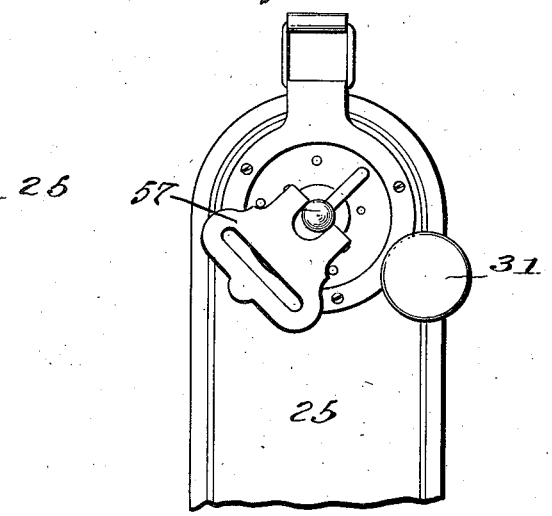

In these drawings 25 denotes what will, for convenience of identification, be termed a "body portion" of the camera. In defining this element, however, the terms "casing", "housing" and many other descriptive terms might be employed but "body portion" is meant to be comprehensive so that it will include any box, container, housing or shell capable of carrying or containing the operating mechanism for carrying the invention into practice and the fact that for the purposes of illustration, applicant has depicted folding or pocket cameras which are now in common use, does not mean that the use of the invention is to be in any way restricted as to its adaptability to other forms of photographic or reproducing instrumentalities in which sensitized elements are employed to be affected when exposed to light, will be apparent.

With full regard, therefore, to the foregoing definition, provision is made for supplying the said body portion with film drawing or moving means, here shown as consisting of a roller 26 and a roller 27, rotatably carried by the said body portion. The roller 26 has a toothed wheel 28 meshing with a toothed wheel 29 on the roller 27 so that when the roller 27 is rotated, the rollers 26 and 27 are driven so that film may be moved by them for a purpose to be presently and more fully explained.

The roller 27 has a shaft or extension 30 projecting from the body portion and provided at its outer end with a member 31 having for its function the application of power for turning the roller. This element 31 is here shown as receiving the extension 30 and a screw 32 is provided for holding these parts in assembled relation. The roller 27 has a trunnion 33 on one end which is properly journaled with relation to the body portion.

The body portion also carries a receptacle 35 to which film may be delivered and in the present showing, the receptacle is cylindrical and has a longitudinally disposed slot through which the film passes to the interior of the said receptacle. The longitudinally disposed slot has one of its edges 36 shown as curved, and the edge 37 is parallel to the edge 36 and it constitutes, as will presently appear, a cutting edge which coacts with a sleeve 38 having a slot 39 for cutting film which is in the slot. The sleeve 38 has a longitudinally disposed straight slot 39, one edge 40 of which coacts with the edge 37 of the receptacle so that when the receptacle or sleeve is turned, one with relation to the other, there will be a coaction between the edges of these slots to cut the film and as the sleeve telescopes with relation to the receptacle, the slots are closed and light is excluded from the interior of the receptacle and while this relation of parts is effective to exclude light which would affect the sensitized surface of the contained film, the joint between these members is not of such a nature as to exclude fluid. The sleeve 38 has a cap 41 fitted on one end, and the said cap has a bayonet joint connected to the sleeve through the medium of the pins 42 and the slots 43. The cap 41 has a flat spring 44 anchored to it and said spring has a pin 45 which extends through said cap and enters one of the slots 43 so that movement of the cap with relation to the sleeve is prevented and the bayonet joint cannot be unlocked until the spring is moved to unseat the pin 45. There is a recess forming a journal bearing 46 in the receptacle opposite the cap and the said recess forms a bearing for a shaft 48, which shaft extends through the cap 41 and is rotatable for a purpose to be presently explained.

The shaft has an operating member A pivotally connected to it so that the said shaft may be rotated and the said shaft is associated with a spool A' the spool being mounted on the shaft and the said shaft has certain movement independently of the spool whereas the said shaft and spool may, under certain conditions, be coupled or locked together so that the motion of the shaft is communicated to the spool. The spool has a slot C in it to permit the insertion of film and a clamping member D is carried by the said shaft and said clamping member D may be regarded as a flange or rib extending longitudinally of the shaft, the said clamping member having its edge slightly curved so that it will partially enter the space between the shaft and the inner surface of the barrel of the spool. One corner of the rib projects beyond the inner wall of the barrel of the spool so that when the shaft is moved in an anti-clockwise direction, the said rib abuts the barrel of the spool and rotates it to set the mechanism for action, that is to say, it turns the spool so that the slot in the spool is carried to a predetermined position with relation to the film so that film may be delivered to the slot of the spool prior to the movement of the clamping member which is operated to frictionally engage the film and cause it to be wound on the spool when the spool is rotated.

The shaft or spindle has flanges or bosses E and F, which enter the barrel of the spool and the flange F is cut away as at G to form a clearance to permit the withdrawal of the shaft from the spool without encountering or abutting the end of the film which projects into the barrel of the spool. The cap 41 is shown as having a flange I to which a tension member J is attached, the said tension member being here shown as a spring which extends over the flange K of the spool and has its end in contact with the barrel of the spool. The tension member is intended to prevent movement of the barrel while the shaft is being rotated to effect the adjustment heretofore mentioned and bringing the slot of the spool into registry with the film to be delivered to it. After the end of the film has been delivered to the spool, rotation of the shaft in a direction opposite to that in which it was moved for setting it will result in moving the clamping member so that it will press the film between the said clamping member and the barrel of the spool and further rotation of the said shaft will cause the spool to rotate, thus winding the film on the spool so that it will be drawn through the exposing chamber as is done in ordinary cameras in which film is transferred from a magazine or source of supply.

By using the spool, associated with the cutting device, lengths of film having one or more exposures may be wound on the spool, and the film so wound may be cut from the web of film while the said film is being held by the feed rollers and the severed portion of the film may be wound on the spool and the spool removed for the purpose of developing that portion which has been photographically exposed. After the spool containing the exposed film has been removed, a substitute spool may be put in place and the operation will be repeated, it being obvious that when the substitute spool is in place and the operating parts are properly set to receive the end of the film, it is advanced or fed forward by the feed rollers. The feed rollers, however, need only be used in the present embodiment of the invention to advance the film sufficiently to bring it into relation to be gripped by the clamping member after which the rotating spool will suffice for drawing the film from the magazine.

In order to guide the sleeve 38 to insure interfitting and proper positioning of parts with relation to one another when it is applied to the casing, the casing has a recess 49 which receives the lug 50 on the sleeve.

When the cap is applied to the casing, it is held therein by the latch 52.

In operation when a length of film has been wound on the spool and it is desired to remove any portion of the film, or the exposed portion of film which is on the spool, from the camera for developing or the like, the receptacle and sleeve is removed from the casing, and as the sleeve and receptacle make a light proof closure, the film may be taken from the casing without exposing said film to light, and the film can then be subjected to treatment for development and the like.

The sleeve 38 has a wall at one end 53 apertured to receive a spindle 54 on the receptacle, and said spindle has a slot 55 which receives a shaft 56, the said shaft being provided with a folding handle 57, whereby it is rotated to turn the receptacle with relation to the sleeve for cutting the film.

I claim:

1. In a camera, a body portion, a film holder therein from which film is removed, a shaft rotatable in the body portion, a spool loosely mounted on the said shaft and removable therefrom, said spool having a slot into which film projects, means associated with the shaft for clamping film against the spool and holding it while the spool is rotated to wind the said film, a member in which the spool and shaft are housed, and means associated with said member for cutting film.

2. In a camera, a body portion, a film holder therein from which film is removed, a shaft rotatable in the body portion, a spool loosely mounted on the said shaft and removable therefrom, said spool having a slot into which film projects, means associated with the shaft for clamping film against the spool and holding it while the spool is rotated to wind the said film, a member in which the spool and shaft are housed, means associated with said member for cutting film, and means for moving film into the slot of the spool.

3. In a camera, a holder for a supply of film, a shaft journaled in the said body, flanged on said shaft, one of which is cut away to form a clearance, a spool mounted on the shaft, said spool having a longitudinally disposed slot therein for the reception of an end of film, means on the shaft for clamping the film against the spool and communicating motion to the said shaft, and a tension member for holding the spool against movement during a predetermined movement of the shaft.

4. In a camera, a body, a cylindrical member and a sleeve rotatably mounted one within the other, said members having slots with cutting edges, the cutting edges of the cylindrical member and sleeve being adapted to coact for cutting film, and means within the cylindrical member and sleeve for winding film.

5. In a camera, a body, a cylindrical member and a sleeve rotatably mounted one within the other, said members having slots with cutting edges, the cutting edges of the cylindrical member and sleeve being adapted to coact for cutting film, a shaft within the cylindrical member and sleeve, a spool loosely and removably mounted on the shaft and slotted to receive film, and means associated with the said shaft for clamping film to the spool and communicating motion of the shaft to the spool.

6. In a camera, a body, a cylindrical member and a sleeve rotatably mounted one within the other, said members having slots with cutting edges, the cutting edges of the cylindrical member and sleeve being adapted to coact for cutting film, a shaft in the said cylindrical member and sleeve, a spool adapted to move longitudinally of the shaft during its application to and removal from the shaft and loosely mounted on the shaft when in assembled operative relation, a flange on the said shaft having a cut away portion to form a clearance for film projecting into the slot of the said spool, and means associated with the shaft and spool for clamping film to the spool and rotating the spool.

7. In a camera, a body, a cylindrical member and a sleeve rotatably mounted one within the other, said members having slots with cutting edges, the cutting edges of the cylindrical member and sleeve being adapted to coact for cutting film, a shaft in the said cylindrical member and sleeve, a spool adapted to move longitudinally of the shaft during its application to and removal from the shaft and loosely mounted on the shaft when in assembled operative relation, a flange on the said shaft having a cut away portion to form a clearance for film projecting into the slot of the said spool, and means for delivering film to the spool.

GEORGE C. BEIDLER.